Patented Sept. 12, 1939

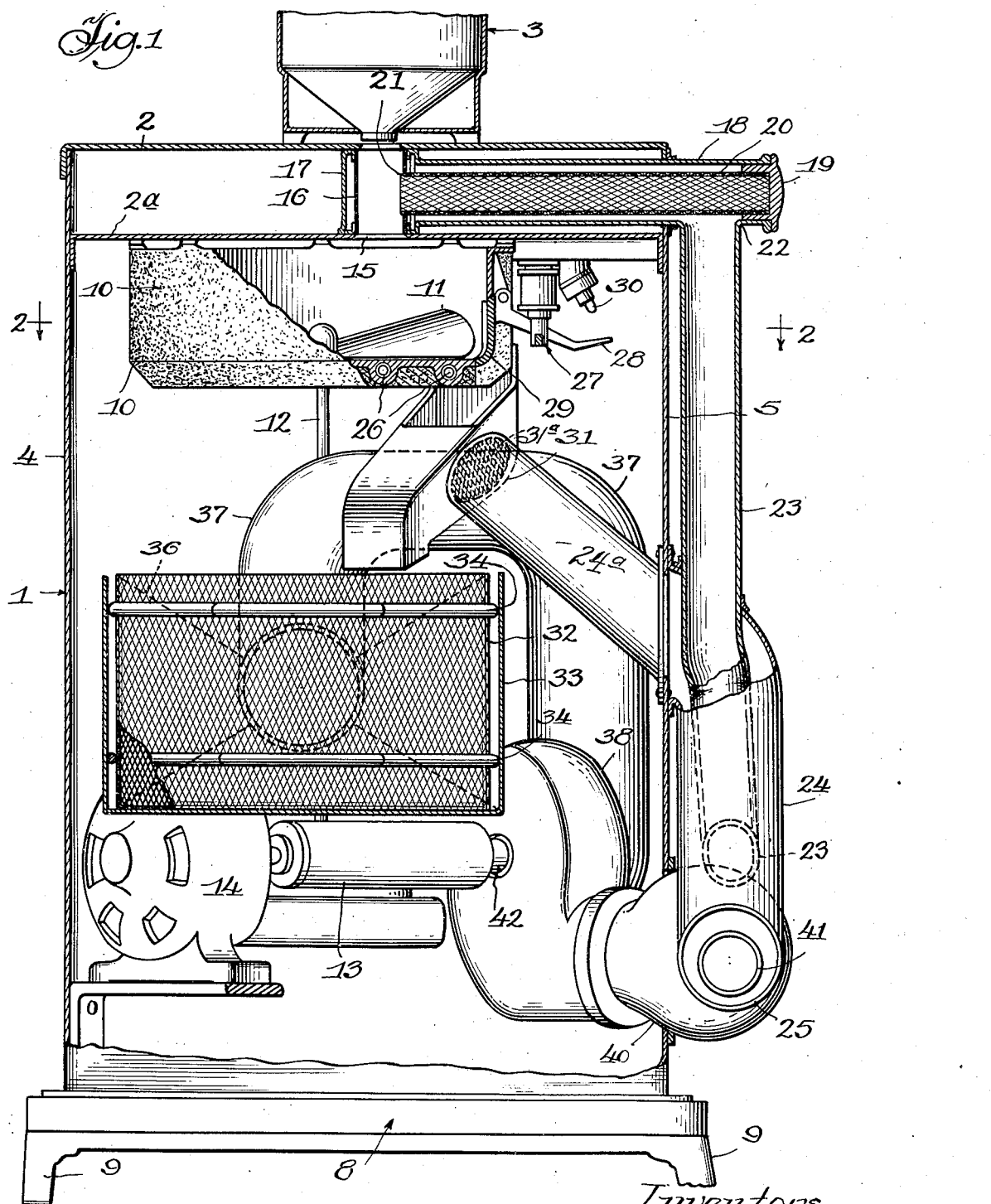

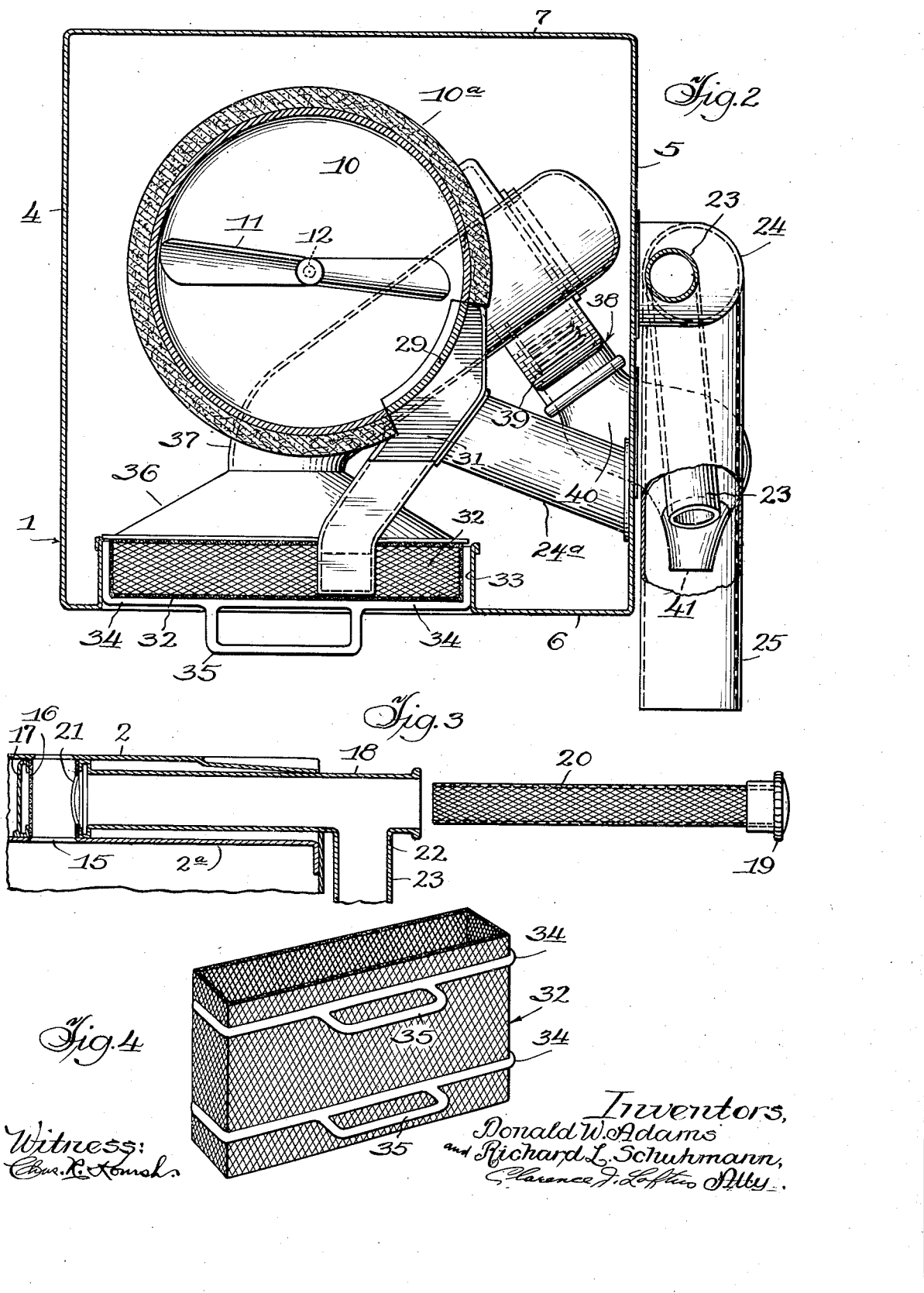

2,172,603

UNITED STATES PATENT OFFICE 2,172,603

COFFEE ROASTER

Donald W. Adams and Richard L. Schuhmann, Louisville, Ky., assignors to Coffee Electrost Corporation, Chicago, Ill., a corporation of Illinois Application July 2, 1937, Serial No. 151,744

7 Claims. (Cl. 34—21)

The present invention relates to coffee roasters and particularly to a novel means and method of removing the exhaust fumes, dirt, etc. from the roasting coffee and for cooling the roasted coffee.

The invention is an improvement on our pending application Serial No. 81,890, filed May 26, 1936.

An object of the invention is to remove quickly and thoroughly the fumes, smoke, steam, dirt, lint, chaff, etc. from the roasting chamber of a coffee roaster while the roasting operation is in progress so that these impurities will not be discharged with the roasted coffee into the cooling chamber. A charge of green coffee contains a large amount of impurities such as dirt, lint, etc. as well as the undesirable constituents of the bean itself which are removed in the roasting operation. We therefore provide a strong suction means for removing this matter and the fumes from the roasting chamber.

A further object is to provide a readily removable duct through which these fumes, dirt, etc. may pass, whereby the duct may be frequently and easily cleaned. The fumes and steam from the coffee carrying the impurities therefrom of course render the dirt, chaff, etc., very wet and sticky so that they adhere to the sides of the duct through which they are being removed and which acts as a filter. As a result this duct will become blocked up in a very short time. To overcome this serious objection we make this duct easily removable so that it can be quickly cleaned and the refuse deposited thereon removed whenever necessary.

Another object is to provide a means and method of dry cooling and quenching roasted coffee more quickly than is possible with any of the prior art means and methods. Instead of the cooling chamber shown in our previous application, we provide a screened tray or receptacle in the front of the cabinet, open to the air, behind which we place an exhaust fan to draw the cool air from outside the cabinet through the cooling receptacle. We are thereby able to cut down the time required for cooling the coffee to approximately one-third the time formerly required. Furthermore, the action of this means is so effective that the roasting is checked immediately and the danger of over-roasting is completely eliminated. With this rapid dry quenching of the coffee go all its inherent advantages such as the retaining of all the aromatic oils because of the complete and rapid closing of the pores in the skin of the bean, etc.

A further object of the invention is to provide a roaster in which is but a single fan for cooling the coffee and removing the vapors, etc. from the roasting chamber.

A further object is to provide a roaster employing but one motor which operates both the agitator in the roasting chamber and the fan or exhaust or blower means.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while we have shown therein a preferred embodiment, it is to be understood that the same is susceptible of modification and change, and comprehends other details, arrangements of parts, features and constructions without departing from the spirit of the invention.

In the drawings:

Fig. 1 is a side elevational view of the unit, partly in vertical cross section.

Fig. 2 is a cross sectional view taken on the line 2—2 of Fig. 1.

Fig. 3 is a cross sectional view of part of the exhaust duct from the roasting chamber with the removable filter shown in side elevation, removed therefrom.

Fig. 4 is a perspective view of the cooling tray or receptacle.

Referring more particularly to the disclosed embodiment our invention comprises a roasting unit housed in cabinet 1 having opening and loading mechanism (not shown) on its top 2 for the green coffee container 3 and having sides 4 and 5, front 6 and back 7. The container may be mounted on base 8 having legs 9.

Mounted in the top of the cabinet is a roasting chamber 10 covered with insulation 10ᵃ and having an impeller or agitator 11 rotatable on shaft 12 and driven through suitable gearing in gear box 13 from motor 14. In the top of the roasting chamber which is attached to plate 2ᵃ spaced from top 2 of the cabinet, is opening 15 for admitting the green coffee from the container 3 through perforated cylinder 16 in annular chamber or passage 17. Extending from the port 17 beyond side 5 of the cabinet is a cylindrical housing 18 closed at its outer end by cap 19 and containing perforated cylinder 20 forming a filter and which is adapted to register with an opening 21 in the cylinder 16.

The housing 18 is connected at 22 to exhaust pipe 23 emptying into pipes or conducts 24 and 25 which conduct the fumes, smoke, steam, etc. outside the room containing the cabinet or wherever it is desired to discharge them. Or, if desired, a bag similar to a vacuum cleaner bag might be attached to the end of pipe 25.

The roasting chamber is similar in construction to that shown in our co-pending application. It is heated by electrical elements 26 the operation of which is initiated by the container opening mechanism. There is also provided therein a thermostat (not shown) which operates to close the circuit to solenoid 27 which in turn operates handle 28 to open discharge door 29 and contact switch 30 for flashing on a signal light (not shown) and turn off the current to the heating elements.

When the door 29 is opened the impeller or agitator 11 discharges the roasted coffee therethrough down the discharge chute 31 to the cooling tray or receptacle 32 removably positioned in compartment 33 in the front of the cabinet. This tray is made of foraminous material and is reenforced by bands 34 having handles 35 for permitting the operator to remove the tray from the cabinet. These bands 34 also act to keep the tray spaced from the side walls of the compartment 33 to insure a free circulation of air on the sides of the tray.

Located directly behind the compartment 33 is funnel or flared part 36 connected to pipe 37 leading into chamber 38 in which is housed a sirocco or other exhaust fan 39 adapted to draw air through the coffee in the cooling tray, thence through members 36 and 37 and then out of the cabinet through the nozzle-like member or venturi 40 and opening 41. The member 40 extends into the exhaust pipe 25 in such a manner as to create an aspirating effect in this pipe and the conduit 24ª which connects through a screen 31ª to the discharge chute 31, and associated parts 23, 18, 15, 16, etc. whereby to draw the fumes, smoke, steam, dirt, etc. from the roasting chamber. After the first charge of coffee has been discharged from the roasting chamber and the cooling operation is in progress, a second charge may be admitted to the roasting chamber so that both operations are in progress at the same time and the operation of the roaster may be maintained continuously.

It is apparent that we provide but one fan having the dual function of drawing cool air through the coffee and aspirating the undesirable fumes, etc. from the roasting chamber. Furthermore, it should be noted that in aspirating the roasting chamber, the fumes, etc. do not come into contact with the moving parts of the fan apparatus but go directly out the exhaust pipes. This is very advantageous as the solid particles in this smoke, being wet and sticky, adhere to any surface and would retard, if not completely stop, the action of the fan or exhaust means.

We have found, however, that the greater mass of these foreign particles will be caught in the filter 20 in the cylinder or sleeve 18 above the roaster. This may be easily and quickly removed and cleaned after pulling out the cap 19. This great amount of undesirable matter is, therefore, removed entirely from the coffee before it enters the cooling tray and provides a great improvement over the usual type of coffee roaster where no means are provided for removing it with the result that it adheres to or is mixed with the coffee when packaged after being cooled.

In the present invention but one motor is necessary. This motor rotates shaft 42 which in turn imparts motion to agitator shaft 12 at a reduced speed through the gearing in box 13 and carries the fan on its outer end to operate it at full speed.

By spreading the roasted coffee out in a thin layer in a perforated container open on all sides to the atmosphere and drawing the cool air through the coffee disposed in this thin layer, we have discovered it is possible to cool it in about one-third the time required by former methods. As this is done without agitation of the roasted coffee, the damage of breaking the beans by the violent agitation, formerly considered necessary, is eliminated. The action of this new means and method is very rapid and arrests the roast immediately. This rapid dry quenching is most beneficial to the coffee because it not only prevents overroasting but by arresting the roast without the use of water causes the beans to retain their aromatic oils and consequently their full flavor.

The economy of operation of our new device, because but one fan and one motor are required, is obvious.

Having thus described our invention, we claim:

1. In combination in a coffee roaster, a casing having a top wall and a transverse wall spaced inwardly therefrom, a hollow cylindrical member extending between said walls to define a charging passageway, a roasting chamber below said transverse wall into which the charging passageway opens for the introduction of coffee beans into the roasting chamber, a tubular member connected at its inner end to said hollow cylindrical member and at its outer end to a downwardly extending tube, a closure cap at the outer end of said tubular member, a perforated tubular filter member fixed at its outer end to the closure cap and at its inner end extended a distance through an opening in the side wall of the hollow cylindrical member so as to extend laterally a distance into the charging passageway, said filter member being removable with the closure cap for cleaning, a suction fan, the lower end of said downwardly extending tube being under the influence of the suction fan to be aspirated thereby and draw the air with its contents out of the roasting chamber and through the filter member.

2. In combination in a coffee roaster, a casing having a wall, a roasting chamber spaced from said wall, a hollow member connecting the wall with the roasting chamber to define a charging passageway thereinto for coffee beans, a fume-vent pipe leading laterally from a side wall of the hollow member to a down pipe, a removable perforated tubular filter member in the fume-vent pipe spaced from the wall thereof and extending through the wall of the hollow member a distance into the charging passageway, the outer end of each of the filter member and fume-vent pipe being closed, a fan, the free end of the down pipe being under the influence of the fan to be aspirated thereby and draw the air with its contents out of the roasting chamber and through the filter member.

3. In combination in a coffee roaster, a casing having a wall, a roasting chamber having its cover in spaced relation to said wall, a tubular passageway member connecting said wall and said cover at openings therethrough to form a charging passageway leading into the roasting chamber, a fume-vent pipe connecting with the passageway member and leading laterally therefrom at substantially right angles thereto and connecting at its outer end with a fume-vent discharge pipe, a removable perforated tubular filter member within the fume-vent pipe and fitting into and passing through an opening in the wall of the tubular passageway member, the outer end of each of the filter member and fume-vent pipe being closed, a suction fan, the fume-vent discharge pipe being under the influence of the fan to draw air with its suspended contents out from the roasting chamber through the passageway member, filter member and discharge pipe.

4. In combination in a coffee roaster, a casing having a wall, a roasting chamber having its cover in spaced relation to said wall, a tubular passageway member connecting said wall and said cover at openings therethrough to form a charging passageway leading into the roasting chamber, a fume-vent pipe connecting with the passageway member and leading laterally therefrom at substantially right angles thereto and connecting at its outer end with a fume-vent discharge pipe, a removable perforated tubular filter member within the fume-vent pipe and fitting into and passing through an opening in the wall of the tubular passageway member, the outer end of each of the filter member and fume-vent pipe being closed, and a suction fan in communication with the fume-vent discharge pipe to draw air with its suspended contents out from the roasting chamber through the passageway member, filter member and discharge pipe, a perforated cooling chamber, a passage from the cooling chamber to the fan, the fan drawing cool air through the cooling chamber and aspirating the fume-vent discharge pipe.

5. In combination in a coffee roaster, a roasting chamber, a stirrer rotatable in the roasting chamber about a vertical axis, a ventilating passage extending upwardly and laterally from the roasting chamber, a removable perforated tubular filter member in the ventilating passage, a fume-vent pipe surrounding and leading away from the filter member, a perforated cooling receptacle, a discharge chute leading from the roasting chamber to the cooling receptacle, a suction fan connected to draw cooling air through the cooling receptacle and to aspirate the fumes from the roasting chamber through the fume-vent pipe.

6. In combination in a coffee roaster, a roasting chamber, a stirrer rotatable in the roasting chamber about a vertical axis, a ventilating passage extending upwardly and laterally from the roasting chamber, a removable perforated tubular filter member in the ventilating passage, a fume-vent pipe surrounding and leading away from the filter member, a perforated cooling receptacle, a discharge chute leading from the roasting chamber to the cooling receptacle, a suction fan connected to draw cooling air through the cooling receptacle and to aspirate the fumes from the roasting chamber through the fume-vent pipe, and a screen-covered opening in a wall of said chute, and tubular connections therefrom to the fan outlet to also aspirate dust, chaff and the like through the screen-covered opening in the chute wall.

7. In combination in a coffee roaster, a roasting chamber having a stirrer rotatably mounted therein for rotation about a vertical axis, an upwardly extending charging passage communicating with the roasting chamber, a fume-vent pipe connected with and extending laterally from the charging passage, a perforated tubular filter member in the fume-vent pipe and extending a distance into the charging passage, a fan, the fume-vent pipe being under the influence of the fan for withdrawing fumes and suspended matter from the roasting chamber through the filter member, the filter member being removable for cleaning purposes.

DONALD W. ADAMS.
RICHARD L. SCHUHMANN.